July 14, 1970

W. H. SINK 3,520,388

CLUTCH OFFERING LOWERED CLUTCH DISENGAGING
FORCE AND WEAR COMPENSATION

Original Filed April 6, 1967

INVENTOR.
WILLIAM H. SINK

BY Richardson B Farley
Harold D. Shall
John F. Tegland

ATTORNEYS

July 14, 1970  W. H. SINK  3,520,388
CLUTCH OFFERING LOWERED CLUTCH DISENGAGING
FORCE AND WEAR COMPENSATION
Original Filed April 6, 1967  3 Sheets-Sheet 3

INVENTOR.
WILLIAM H. SINK
BY
ATTORNEYS

United States Patent Office 3,520,388
Patented July 14, 1970

3,520,388
CLUTCH OFFERING LOWERED CLUTCH DISENGAGING FORCE AND WEAR COMPENSATION
William H. Sink, Auburn, Ind., assignor to Dana Corporation, Toledo, Ohio, a corporation of Virginia
Continuation of application Ser. No. 628,999, Apr. 6, 1967. This application Mar. 17, 1969, Ser. No. 808,380
Int. Cl. F16d 13/48
U.S. Cl. 192—70.29
7 Claims

ABSTRACT OF THE DISCLOSURE

A clutch comprising a spring biased pressure plate is provided wherein the urging springs of the clutch are disposed axially extending to engage a collector ring. The collector ring transfers the engaging force of the springs to a series of angled links which, in turn, are connected to the clutch engaging levers. By this structural arrangement, wear compensation and reduced disengaging force are provided as characteristics of the operative clutch.

This case is a continuation of application No. 628,999, filed Apr. 6, 1967, and now abandoned.

BACKGROUND OF THE INVENTION

This invention relates generally to normally engaged spring loaded friction clutches and, more particularly, to a novel arrangement for applying the force of a spring means therein comprising a link and engaging spring arrangement which radically reduces clutch disengaging force and also provides wear compensation so that as clutch wear occurs there is no appreciable reduction in engaging force between the pressure plate and flywheel.

Although spring loaded friction clutches are known which provide the foregoing advantages of wear compensation and reduced spring disengaging force, these clutches are not adaptable to all clutch applications or sizes For example, a spring loaded clutch having reduced spring disengaging force and wear compensation is shown in U.S. Pat. No. 3,276,555, issued on Oct. 4, 1966, and owned by a common assignee. In the structure shown therein, resilient means carried by the driving member acts through a series of lever means carried by the driving member to urge an engaging portion into and out of frictional driving engagement with the driven member. The lever means and resilient means includes means for maintaining the resilient load on the engaging portion substantially constant as it moves towards the driven member.

This clutch structure has proved generally successful in operation, however, it sometimes suffers in some applications because each of the pivotal springs works on a short lever arm and, therefore, must apply a high loading to the lever. This loading is increased, upon rotation, due to centrifugal forces thus giving this clutch a lower than desired burst speed Another type of clutch which offers wear compensation and reduced clutch disengaging force is disclosed in U.S. patent application Ser. No. 549,009, filed May 10, 1966, now Pat. No. 3,394,788, and owned by a common assignee. The spring loaded clutch shown therein includes a pressure plate which is biased towards a driven friction disk by a series of spaced compression springs which are disposed angularly with respect to the axis of rotation of the pressure plate. The action and reaction ends of each of the springs in this clutch are spaced radially constantly while, upon movement of the pressure plate towards its disengaged position, the axial spacing between the springs ends is decreased. The axial decrease in distance between the action and reaction ends with a constant radial distance being maintained results in a shift of the angular relationship of the springs such that the effective spring force on the pressure plate reduces at a lower than normally expected rate between full engaged and wear position and increases at a lower than normally expected rate between engaged and release positions to provide lower clutching pressure and reduced wear due to a resultant higher loading pressure than normally expected under wear conditions.

This clutch structure performs fairly satisfactorily, however, because of the clearances required for the compression springs and the space limitations inherent in a clutch utilizing this structure, the size and configuration of the springs are limited and, therefore, this type of clutch has not proved completely satisfactory for the full range of clutches manufactured. Further, because of the requirement for precise location of the fulcrums for the spring ends, the manufacturing tolerances normally experienced in clutch manufacture sometimes radically alter the desired operating characteristics of this clutch when assembled.

It is, therefore, an object of this invention to provide a clutch having an improved engaging spring compensation arrangement.

It is an additional object of the invention to provide a clutch having compensating characteristics, the said clutch being easily manufactured and maintained.

It is a further object of the invention to provide a clutch having an angled link arrangement which transfers the spring engaging force to the clutch release levers in a compensating manner.

It is another object of the invention to provide a clutch having wear compensation and reduced spring disengaging force which does not require excessively close manufacturing tolerances.

In furtherance of the foregoing objects, a clutch comprising a driving member in the form of a flywheel that includes a pressure plate biased towards a friction disk is provided. Disposed between the pressure plate and a clutch bracket attached to the driving member are a series of pivoted clutch release levers which react against the pressure plate to move it into and out of engagement with the driven member. A series of circumferentially spaced axially extending springs act between the clutch bracket and the levers to urge the clutch into engaged position. A collector ring disposed axially outwardly of the clutch bracket receives the expansive force of the spring means and transfers this force to the release levers by means of a series of links connected to the levers and collector ring and extending angularly outwardly from the clutch release levers to engage the collector ring.

Further and additional objects and advantages of the instant invention will be had from the detailed description following the drawings appended thereto wherein.

Figure 1:
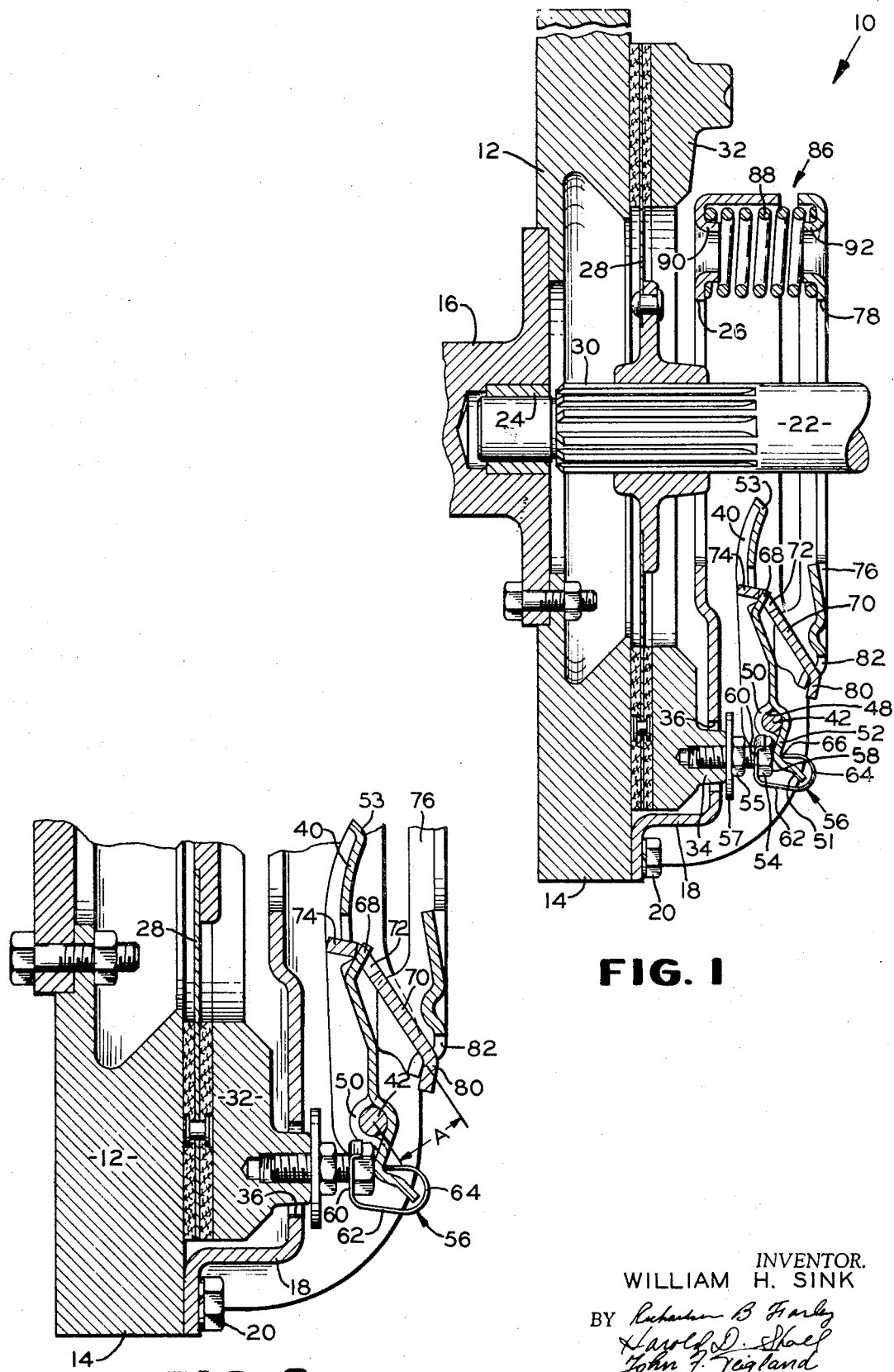
FIG. 1 is a side sectional view of the clutch embodying the invention taken on line 1—1 of FIG. 2.
Figure 2:
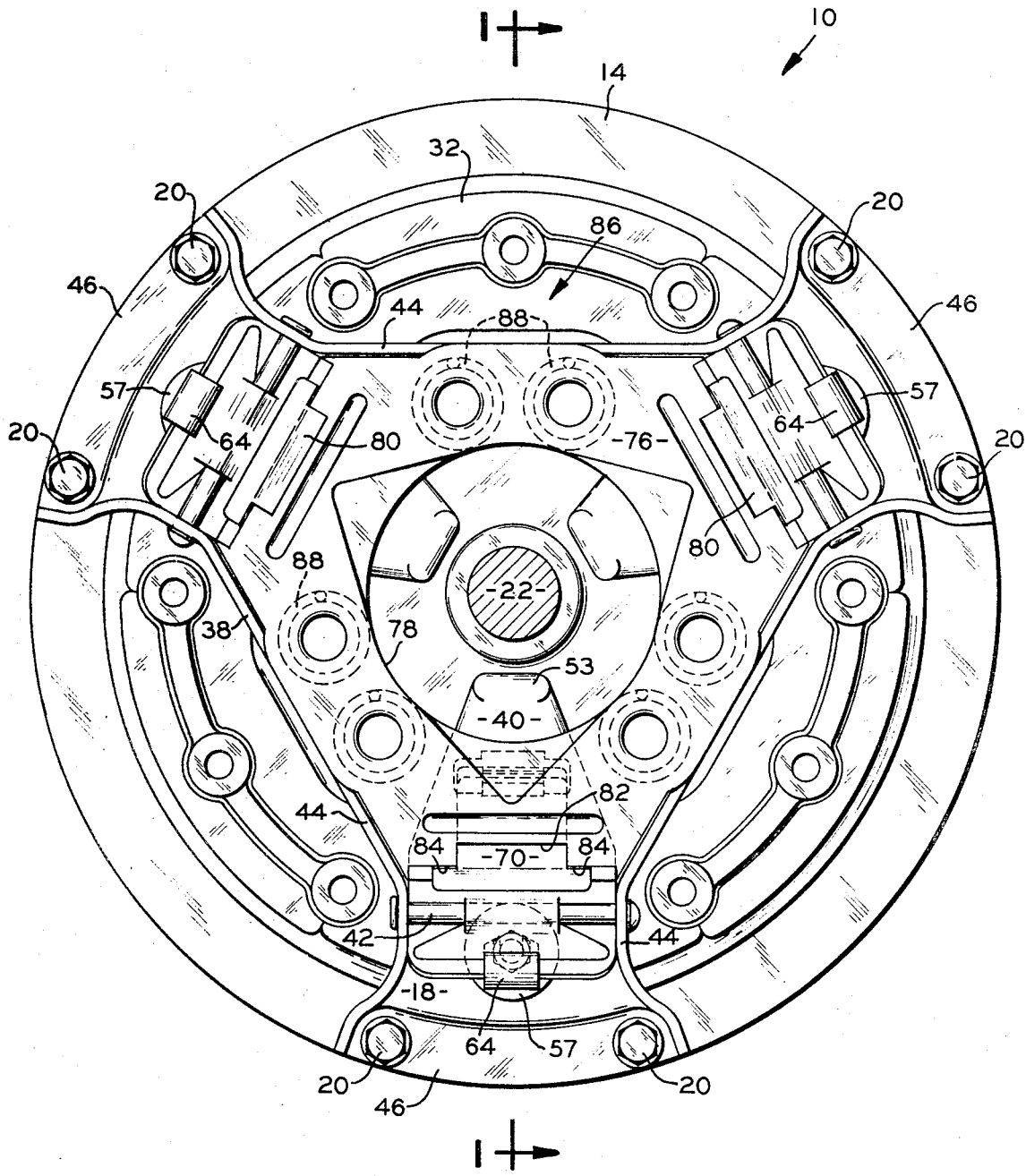
FIG. 2 is a view of the invention looking from the output shaft end.

Referring now to the drawings for a better understanding of the invention where the same reference numbers are used in the several views thereof to indicate the same parts. As is shown most particularly in FIGS. 1 and 2, a spring loaded clutch 10 is provided drivingly connected for unitary rotation with a flywheel 12 having a circular flange 14 and supported from a driving shaft 16 that extends from an engine or prime mover (not shown). A clutch bracket 18 of slightly disk shape in cross-section and having a triangular shape 38 in end view includes three lug-like portions 46 extending from the apexes of the triangular shape for attachment to the circular flange 14 of the flywheel 12 by a series of bolts 20 so as to rotate unitarily therewith. Thus the flywheel 12, clutch bracket 18 (and its connected parts) always assume a rotational speed dictated by the driving shaft 16.

An output shaft 22, shown only fragmentarily, is adapted to alternately be declutched from or clutched into a driving relationship with the flywheel 12 and, as shown, is piloted at its forward end in the flywheel 12 by a bearing means 24 for relatively frictionless rotation relative to the flywheel. The output shaft 22 extends axially rearwardly from the bearing means so as to project through a circular aperture 26 in the clutch bracket 18 for conventional connection to a driving train of a vehicle or the like (not shown). A driven member 28 is splined at 30 to the output shaft 22 for unitary rotation therewith and limited relative axial movement thereto, the said splined portions being at the forward end of output shaft 22. By this arrangement the driven member 28 is adapted to be axially pressed into driving engagement with the flywheel 12 for unitary rotation therewith. Movement of the driven member 28 axially is provided by a pressure plate 32 which is drivingly connected to the clutch bracket 18 by a plurality of lugs 34 extending axially from the rear surface thereof. The lugs 34 register in slots 36 formed in the lug portions 46 of the clutch bracket 18.

A series of three radially extending clutch levers 40 are pivoted to the clutch bracket 18, each by a pin means 42 extending through a pair of opposite flanges 44, 44 formed on the clutch bracket 18 at lug portions 46. Each of the flanges 44 extends continuously between a pair of adjacent lug portions 46 and terminates adjacent the radial outer extremity of the lug portions so that a total of three flange portions 44, 44 and 44 are sufficient to form opposed mounting means for the three pin means 42. Each of these pin means is peened over at its ends so as to be securely held between the adjacent flanges 44, 44, with each pin means 42 extending through an aperture 48 in one of the clutch levers 40. The apertures 48 are conveniently formed by offset shouldered portions 50 in each of the clutch levers 40. A radially outwardly outer end 51 is formed on each clutch lever 40, this end being generally of a hook shape in cross-sections so as to provide an offset engaging portion 52 radially inwardly from the outer extremity of the clutch lever with the offset engaging portion acting against the pressure plate 32 against one of a series of three screws 54 which are threadedly retained in the pressure plate 32. Each of the screws 54 is fixedly adjusted in an axially extending direction by a nut 55 which is threaded into tight abutment against a washer 57 seated flush with a rearward face 59 of the pressure plate 32.

A spring clip means 56 connects a head 58 of each of the screws 54 to the radially outer ends 51 of the clutch levers 40. More particularly, spring clip 56 is generally L-shaped with a leg 60 thereof being the attaching portion and having a slot for the entrance of one of the screws 54 while a second leg 62 extends outwardly parallel to the screw 54 and has a hook-shaped end portion 64, an extremity 66 of which has line fulcrum contact to the hook-shaped outer end portion 51 of the clutch lever 40. As is more particularly described in U.S. Pat. No. 2,724,475, issued Nov. 22, 1955, and owned by a common assignee, the spring clip construction just related furnishes an anti-rattle characteristic for the pressure plate 32, positive disengagement thereof and easy removal of the spring clip for adjustment of the clutch 10 through the screws 54, if desired. Disengagement of the pressure plate 32 is, of course, provided by a throw out bearing (not shown) acting axially leftwardly against the radial inner ends 53 of each of the clutch levers 40.

Means are provided to urge the clutch levers and thereby the pressure plate 32 constantly towards engagement with the flywheel 12. Radially inwardly of the pin means 42 and fixedly attached to each of the clutch levers 40 is an integral tab 68. This tab extends angularly and backwardly from the main portion of the clutch lever 40 transversely intermediate its sides. A link 70 having a transversely extending aperture 72 therein is connected to each of the clutch levers 40 by engagement of the tab 68 within the aperture 72. An end 74 on the link 70 that is radially and axially inturned insures that the respective link and clutch lever remain engaged during operation of the clutch and provides a knife edge for pivotal movement of the link 70. Link 70 extends both radially outwardly and axially rearwardly away from the clutch lever 40 so as to be connected angularly to a collector ring 76, also of substantially triangular shape with the apexes of the triangular shape truncated (in end view). Collector ring 76 includes a centrally located bore 78 therethrough for passage of the output shaft 22.

Means is provided to connect the rearwardly extending end of the link 70 to the collector ring 76. At the radially outer and rearward end of the link 70 it is provided with an angled end 80 that is bent so as to extend radially outwardly and forwardly towards the clutch lever 40. The angled end 80 is insertingly held within a transversely extending slot 82 in the collector ring 76 by abutting against the sides of a pair of notched portions 84 provided on the truncated portions of the collector ring. This abutting connection insures positive location of the link 70 relative to the collector ring and insures that the collector ring and link will remain in assembled condition during operation of the clutch 10 and provides a knife edge for pivotal movement of the link 70.

Radially opposite each of the links 70, mounted between the collector ring 76 and clutch bracket 18, are a series of spring means 86, which expandingly force the collector ring 76 axially away from the clutch bracket 18. Each of the spring means 86 comprises a pair of springs 88, 88, disposed so as to bear equally on opposite sides of a center line drawn through the center line of the directly opposed clutch lever 40. Each of the pair of springs 88 seats in oppositely facing and aligned boss portions 90, 92 formed on the clutch bracket 18 and collector ring 76, respectively, the said bosses providing guidance and axial alignment for their respective seated spring 88 to maintain the axis of the spring parallel to the axis of the clutch 10.

It should be apparent from the foregoing description that the links 70 act against the clutch levers 40 in an axial rearward direction by being urged in this direction by the expanding force of the springs 88 acting against the collector ring 76 in a similar direction. Thus, the collector ring 76 pulls the links 70 in the rearward axial direction, placing a tension force on each of the links 70 that acts throughout its cross sectional area along its entire length between its pivots with the collector ring 76 and lever 40. Because the series of these links are spaced equidistantly (120° apart) and because the spring means 86 are also so spaced, it is apparent that the collector ring 76 moves axially parallel as the springs 88 expand and compress during movement between engaged, disengaged and full wear position. It should also be apparent that the link 70 pivots relative to the clutch levers 40 during movement of the pressure plate 32 between the aforementioned positions so that the action force acting against the clutch levers 40 and available as clutching pressure for the pressure plate 32 is both a function of the relative compression of springs 88 and the geometry or mechanical advantage afforded by the novel angular relationship of link 70 relative to clutch levers 40. This relationship will now be described in more detail.

Figure 3:
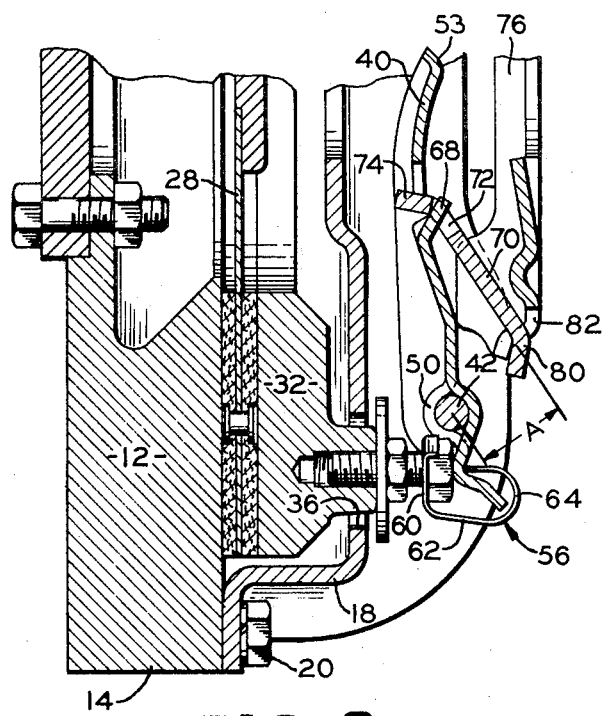
FIG. 3 is an enlarged partial sectional view of the clutch showing the full engaged position.
Figure 4:
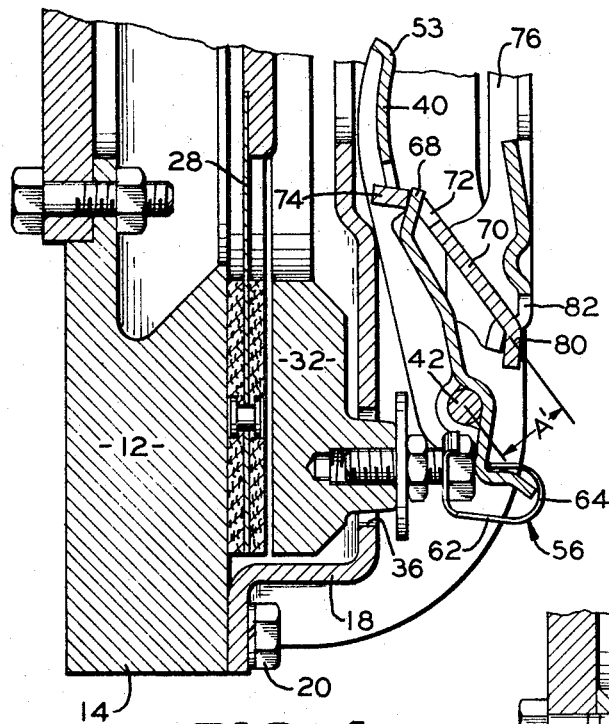
FIG. 4 is an enlarged partial sectional view of the clutch showing the full disengaged position.
Figure 5:
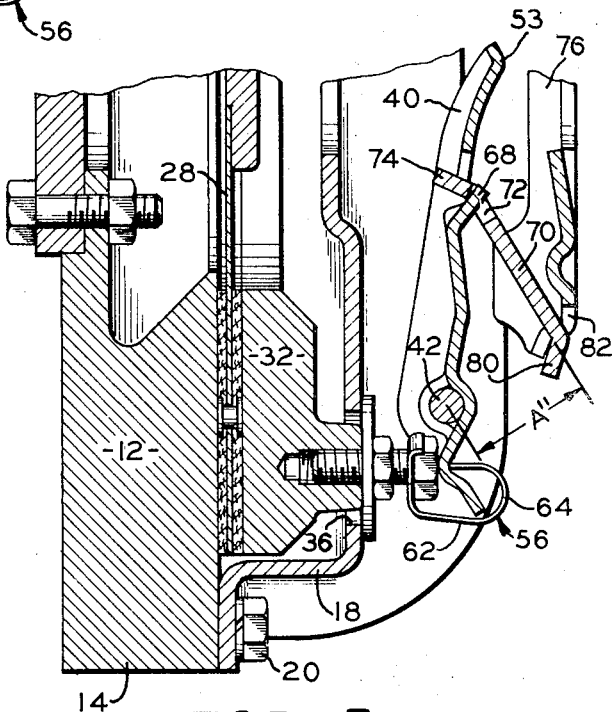
FIG. 5 is a similar view showing the clutch in full wear position.

Referring generally to FIGS. 3, 4 and 5, it can be seen that the geometric distances A, A' and A" represent the effective moment arm available for the useful force imparted to the clutch lever 40 through the link 70 and the springs 88 for pressure plate engagement. These three figures thus graphically portray the increasing effective moment arm available due to the pivoting action of the link 70 as the pressure plate 32 goes from engaged to full wear positions and also indicate the decreasing effective moment arm available as the pressure plate 32 goes from engaged to disengaged position. It can be seen that the link 70 thereby offers a mechanical advantage for the springs 88 to give the clutch 10 the operating characteristics of wear compensation and decreased disengaging force. More specifically, the moment arm A is of lesser magnitude than the moment arm A" to provide compensation for wear. Also, the moment arm A' is of lesser magnitude than the moment arm A to provide reduced disengaging force.

As is well known, the force imposed by the springs 88 is not constant in the aforementioned three positions of the clutch, nor is it constant in movement between these positions. The springs 88 are more compressed in the released position relative to their state in the engaged position and also are more expanded in their full wear position over their state in the engaged position. However, as indicated graphically in FIGS. 3–5, disposition of the links 70 so as to rotate only in the upper half of a single quadrant of a circle provides a compensating effect for the expanding and compressing springs 88, this compensation overcoming almost completely the opposite tendency of the springs 88 so as to yield a higher than expected clutching pressure at full wear position and a reduced force for releasing of the clutch.

Figure 6:
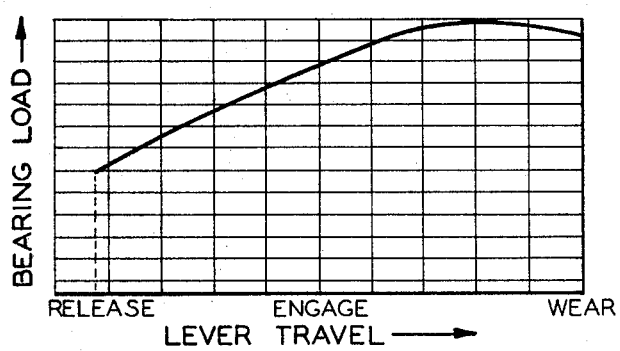
FIG. 6 is a curve graphically depicting bearing load against lever travel in a typical clutch constructed according to the principles of this invention.

The illustration of FIG. 6 graphically portrays the combined effect of the compression and expansion of springs 88 acting along with the compensating effect of the angle links 70. The bearing load illustrated is that experienced by a typical clutch utilizing the principles of this invention. As can be seen, as the clutch goes from full engaged to full released position, the actual loading on the release bearing continuously reduces thereby providing a reduced release effort by the operator. This is in complete contradistinction to the heretofore known conventional clutches wherein the load on the throw out bearing continuously increased as the engaging springs of the clutch are compressed to a greater and greater degree.

The throw out bearing load illustrated in FIG. 6, between the indicated full engaged and wear positions denoted on the abscissa, is not only representative of the load applied to the release bearing but also of the load impressed by the pressure plate 32 on the driven member 28. It can be seen that this loading increases as the clutch approaches full wear conditions, that is, the springs 88 expand but the compensating effect of the links 70 overcome the increasing extension of the springs 88 and the reduced load offered thereby almost completely. As can be seen, the loading on the driven member 28 only tails off very slightly at a point near almost full wear conditions.

Although the present invention has been described in connection with a certain specific example, it should be clear that the principles thereof could be provided by differing structures (for example, a clutch in which the angled link acted in compression on the clutch lever) and that such structures would be equivalent. It should also be apparent that the principles of the invention could be provided in differing types of clutches. The scope of the invention is, therefore, not to be limited by the example given but is to be assessed as defined and limited by the appended claims.

I claim:

1. A spring loaded clutch comprising combination; (a) coaxial driving and driven members, (b) said driving member including, (1) a reaction member disposed in axially spaced relationship relative to said driven member, (2) a pressure plate drivingly connected for unitary rotation with said driving member and said reaction member and movable axially relative to both, (3) a resilient means disposed between said reaction member and said driving member and extending axially straight therebetween, (4) lever means movable to engage and disengage said pressure plate from said driven member (5) link means disposed between said lever means and said reaction member and being pivoted to each at first and second pivot points and extending angularly therebetween to provide a linear extent and also having a width and a thickness, said link means providing for constantly decreasing the force effectiveness of said resilient means as said clutch moves to disengage from engaged position by composing a tension force, acting throughout said width, thickness and linear extent between said first and second pivot points on said lever means.

2. A spring loaded clutch comprising in combination; (a) coaxial driving and driven members, (b) said driving member including, (1) a reaction member disposed in axially spaced relationship relative to said driven member, (2) a pressure plate drivingly connected for unitary rotation with said driving member and said reaction member and movable axially relative to both, (3) a resilient means disposed between said reaction member and said driving member and extending axially straight therebetween, (4) lever means movable to engage and disengage said pressure plate from said driven member, (5) link means disposed between said lever means and said reaction member and being pivoted to each and extending angularly therebetween, and (6) said lever means includes aperture means and tab means and said link means extends through said aperture means and engages said tab means to thereby form a pivot between said lever means and link means.

3. A spring load clutch comprising in combination; (a) coaxial driving and driven members, (b) said driving member including, (1) a reaction member disposed in axially spaced relationship relative to said driven member, (2) a pressure plate drivingly connected for unitary rotation with said driving member and said reaction member and movable axially relative to both, (3) a resilient means disposed between said reaction member and said driving member and extending axially straight therebetween, (4) lever means movable to engage and disengage said pressure plate from said driven member, (5) link means disposed between said lever means and said reaction member and being pivoted to each and extending angularly therebetween, and (6) said reaction member and link means include aperture means and tab means for forming the pivot between said link means and reaction member.

4. A spring loaded clutch comprising in combination; (a) coaxial driving and driven means, (b) said driving means including, (1) a clutch bracket disposed in axially spaced relationship relative to said driven member, (2) a pressure plate drivingly connected for unitary rotation with said clutch bracket and movable axially relative thereto, said connection being provided by a series of lugs and a series of slots mounted with said clutch bracket and said pressure plate, (3) a collector ring disposed axially outwardly of said clutch bracket, (4) resilient means disposed between said collector ring and said clutch bracket so as to extend axially therebetween, (5) seating means formed integrally with said clutch bracket and said collector ring to provide action and reaction means for said resilient means, (6) lever means pivotally mounted to said clutch bracket for moving said pressure plate into engagement with said driven means, and (7) link means extending angularly relative to said collector ring and said lever means and pivoted to said collector ring and said lever means for constantly increasing the effectiveness of said resilient means to apply the urging load thereof on said pressure plate as said pressure plate moves toward said driven member.

5. The combination set out in claim 4 wherein said pivotal connection between said link means and said collector ring comprises an extending end of said link disposed in an aperture means in said collector ring, said extending end having tab means and said tab means engaging in notch means in said collector ring.

6. The combination set out in claim 4 wherein said pivotal connection between said link means and said lever means comprises aperture means in said link means and tab means on said lever means engaging therein.

7. A clutch comprising in combination; (a) coaxial driving and driven means, (b) said driving means including, (1) a clutch bracket disposed in axially spaced relationship relative to said driven member, (2) a pressure plate drivingly connected for unitary rotation with said clutch bracket and movable axially relative thereto, said connection being provided by a series of lugs and a series of slots mounted with said clutch bracket and said pressure plate, (3) resilient means, (4) reaction means mounted with said clutch bracket means for seating said resilient means, (5) lever means pivotally mounted to said clutch bracket for moving said pressure plate into engagement with said driven means, and (6) link means having a width and a thickness to form a cross sectional area and a linear extent extending angularly relative to said resilient means and connecting said resilient means and said lever means and imposing a tension force acting throughout said cross sectional area at at least some points along said linear extent of said link means for constantly increasing the force effectiveness of said resilient means to apply the urging load thereof on said pressure plate as said pressure plate moves toward said driven member and for constantly decreasing the force effectiveness of said resilient means on said pressure plate as it moves to disengaged position from engaged position.

References Cited

UNITED STATES PATENTS

| | | | |
|---|---|---|---|
| 2,057,802 | 10/1936 | Tatter | 192—111 |
| 2,249,043 | 7/1941 | Root | 192—70.29 |
| 2,496,411 | 2/1950 | Root | 192—70.29 |
| 2,616,540 | 11/1952 | Miller | 192—111 |
| 2,727,612 | 12/1955 | Thelander | 192—70.26 XR |
| 3,276,555 | 10/1966 | Phelps et al. | 192—89 XR |
| 3,308,913 | 3/1967 | Montgomery | 192—70.29 |

MARTIN P. SCHWADRON, Primary Examiner

L. J. PAYNE, Assistant Examiner

U.S. Cl. X.R.

192—70.3, 99, 111